Patented Mar. 5, 1940

2,192,277

UNITED STATES PATENT OFFICE 2,192,277

ORGANIC ESTERS OF CELLULOSE AND METHOD OF MAKING THE SAME

George Schneider, Montclair, N. J., assignor to Celanese Corporation of America, a corporation of Delaware No Drawing. Continuation of application Serial No. 231,397, November 5, 1927. This application February 3, 1932, Serial No. 590,634. In Canada October 17, 1928

16 Claims. (Cl. 260—227)

This invention relates to the manufacture of organic esters of cellulose and particularly cellulose acetate from cellulose or its near conversion products.

This application is a continuation of application 231,397 filed November 5, 1927.

An object of my invention is to produce an organic ester of cellulose, particularly cellulose acetate, which, when dissolved in organic solvents such as acetone, forms solutions of low viscosity and which displays the otherwise desirable features of an organic derivative of cellulose of higher viscosity characteristics.

Another object of my invention is to produce cellulose acetates of low viscosity characteristics that are miscible and compatible with natural gums or resins of synthetic resins of the phenolaldehyde or phenol-acetone type, both in solutions of the same in organic solvents and in the films produced by the evaporation of the solvent from solutions containing the cellulose acetate and such gums or resins.

Another object of my invention is to produce a cellulose acetate of low viscosity characteristics, which, when used as a part or the whole of a lacquer base produces films that are highly resistant for a long period of time to the blushing or softening action of water. Another object of my invention is to produce a cellulose acetate which when used as an ingredient of a lacquer base produces films of high gloss. Other objects of my invention will appear from the following detailed description.

One of the essential requirements of a lacquer or varnish containing derivatives of cellulose as the lacquer base is that such lacquers contain a large percentage of the cellulose derivatives and still be of such low viscosity that it may be readily sprayed, brushed or otherwise applied to the surface to be coated and that the films produced be tough and water resistant. To satisfy these requirements the cellulose derivative to be used as the lacquer base must have such viscosity characteristics that a comparatively concentrated solution of the cellulose derivative in the solvent used as the vehicle in the lacquer is of comparatively low viscosity.

When organic esters of cellulose and particularly cellulose acetate, are to be used as the whole or part of a lacquer base, it is particularly desirable that they possess low viscosity characteristics. However, the preparation of a low viscosity organic ester of cellulose, which has the desirable properties of an organic ester of cellulose of high viscosity characteristics, has been heretofore extremely difficult. This is due to the fact that in the methods formerly used for the preparation of low viscosity organic esters of cellulose, the conditions were such as to destroy the desirable quality of the organic ester of cellulose. Thus, the former cellulose acetates of extremely low viscosity produce films or coatings that are dark in color, generally brittle, or of poor resistance to the action of water. These objectionable qualities are attributed to the degrading action of the extreme conditions prevailing during the manufacture of such low viscosity cellulose acetates. Moreover, it has been found that such former low viscosity cellulose acetates of normal solubility in organic solvents are not compatible with natural gums or resins or some synthetic resins, so that when such gums or resins are added to a solution of the cellulose acetate, incipient precipitation or milkiness immediately occurs and the film produced from such solutions are cloudy or opaque. The cellulose acetates having low viscosity characteristics previously made have been produced, not deliberately, but rather accidentally through mishap in the manufacture of the higher viscosity product. Thus, when the temperature of reaction is permitted to greatly exceed the temperature of reaction ordinarily used for the products of viscous cellulose acetate, the acetylating mass becomes dark in color, owing to the charring effect of the catalyst, such as sulphuric acid, at this high temperature. This dark color is subsequently imparted to the cellulose acetate formed as the products of reaction, and in turn to the lacquer or film produced from such cellulose acetate. Moreover, at such high temperatures, degradation of the cellulose molecule takes place, and consequently acetates of these degradation products are produced. Such degraded cellulose acetates are of a horny or friable nature, so that films produced from a lacquer containing them are brittle and of poor water resistance.

I have further found that degradation of the cellulose molecule is avoided by the adoption of novel methods of conducting and controlling both the esterification of the cellulose and the ripening of the resulting cellulose ester.

I have discovered that the degradation products of cellulose and cellulose acetate are produced during acetylation in the presence of sulphuric acid as catalyst, when the reaction temperature is permitted to exceed a definite critical temperature, but that when the temperature of reaction is kept slightly below or at this critical temperature, there are formed products of low viscosity but which are not substantially degraded. The exact value of this critical temperature cannot be stated definitely since it varies with the proportion of the sulphuric acid used, decreasing with the increase of the amount of sulphuric acid used. By way of example, it may be stated that with the amount of sulphuric acid used in the specific example set forth below, the critical temperature is from 50° to 55° C.

In accordance with my invention, the cellulose is acetylated while controlling the temperature in such a manner that a reaction temperature reaches but does not exceed this critical temperature. This temperature is maintained for a period of time until the viscosity of the reaction product is reduced to the desirable degree. The product thus formed does not possess the objectionable degraded qualities of the low viscosity product formerly produced. The cellulose acetate formed by my process has all the desired qualities of high viscosity cellulose acetate and yet forms solutions of such low viscosity as to come within the definition of viscosity required of the cellulose nitrate known in the art as "lacquer grade." The cellulose acetate produced in accordance with my invention has viscosities of 0.1 to 5.0 as determined by specification D-50 of the British Engineering Standards. This cellulose acetate is compatible with gums and resins both when in solution and in the film produced from such solutions.

In order to prevent or minimize degradation of the cellulose nucleus and also in order to improve the product in other respects, the ripening operation may be effected in two stages, the first being effected by allowing the reaction mixture containing the esterified cellulose to stand after the addition of water or other similarly acting agents, and the second being effected in the presence of weak acid, the product obtained in the first stage being precipitated with water and afterwards mixed with the dilute acid.

I have found that the compatibility or intersolubility of cellulose acetate solutions with solutions of natural gums or resins or synthetic resins, such as phenol-aldehyde resins or phenol-acetone resins and particularly those synthetic resins that are prepared in the presence of an acid catalyst, is a factor of the degree of hydrolysis of the cellulose acetate. As is well known, the degree of hydrolysis and the acetyl content of the cellulose acetate is measured by the solubility of the cellulose acetate in various solvents, these solubilities progressively changing as the hydrolysis proceeds. I have found that the point of hydrolysis at which the cellulose acetate displays the greatest compatibility or intersolubility with gums or resins is that which exists when the cellulose acetate has a solubility, that may be defined as between being soluble in hot chloroform and showing a very slight plasticity in hot chloroform, which cellulose acetate at the same time is soluble in a hot mixture of equal parts of alcohol and benzene without the addition of water. At this point, the cellulose acetate has the further highly advantageous characteristic of producing films from lacquers containing it that have a high and desirable gloss, which gloss is higher than that produced from other known cellulose acetates.

In order to further explain my invention, the following detailed description of one mode of carrying out the same is given.

100 parts of cellulose, such as cotton, cotton linters, wood pulp or reconstituted cellulose with or without previous preparation such as activation with acids and/or alkalis are added to a mixture of 300 to 400 parts of acetic anhydride and 300 to 400 parts of acetic acid containing from 10 to 15 parts of sulphuric acid. The temperature to which this mixture is cooled before the cellulose is added is determined by experiment with the particular cellulose used, so that the maximum temperature reached in the reaction does not exceed 50° to 55° C. At this point, the temperature is maintained between about 40 to 55° C. by gentle warming until the viscosity of the charge has been lowered to the desired degree. This usually requires about 2 hours or longer depending somewhat on the nature of the catalyst used. The mass is then lowered to the hydrolizing temperature of below 20° to 30° C. and a small quantity of water, (say, from 10 to 40 parts) or water containing acetic acid and/or hydrogen peroxide is added for ripening in the usual manner. The ripening is interrupted by precipitating the mass with water at a stage when a sample is soluble in hot chloroform, and soluble in a hot mixture of equal parts of alcohol and benzene containing a small amount of water. The precipitated product is then subjected to weak acid hydrolization. At the completion of this hydrolization, the product displays a very slight plasticity in hot chloroform and is soluble in a mixture of equal parts of hot alcohol and benzene without the addition of any water. Of course this cellulose acetate is soluble in various other organic solvents such as acetone, methyl acetate, etc.

It is to be understood that the foregoing details have been given merely by way of illustration and that many variations may be made therein without departing from the spirit of my invention. Thus the proportion of the reactants used, the time and temperature of the reaction, etc., may be varied to produce the cellulose acetate of the desired viscosity characteristics and qualities. Moreover, this invention is not limited to the preparation of cellulose acetate, but is also for making other organic esters of cellulose such as cellulose formate, cellulose propionate, cellulose butyrate. When the cellulose formate is prepared formic acid is used for the esterification. For the preparation of the propionate, butyrate, etc., the corresponding organic acid anhydride is substituted for the acetic anhydride in the example set above.

The organic esters of cellulose prepared in accordance with my invention is of general application. It is particularly useful as an ingredient of a lacquer of which it may form a part or the whole of the lacquer base. A preferred form of lacquer contains cellulose acetate made in accordance with my invention, a synthetic resin of the phenol-aldehyde or phenol-acetone type prepared in the presence of an acid catalyst, a plasticiser, a low boiling solvent and higher boiling solvents. Examples of plasticisers that may be used are tri-cresyl phosphate, triacetin, diethyl phthalate, etc. The low boiling solvent used may be a mixture of one or more of the following: acetone, alcohol, benzene. Examples of the higher boiling solvents are ethyl lactate, diacetone alcohol, tetrachlor ethane and benzyl chloride.

Having described my invention what I claim and desire to secure by Letters Patent is:

1. Method of producing organic acid esters of cellulose of low viscosity characteristics which comprises esterifying cellulose in the presence of an esterifying agent containing a strong esterification catalyst, permitting the temperature of the esterification mixture to rise above normal esterification temperature for a short period during the esterification, and then completing the esterification at normal esterification temperatures, whereby a cellulose ester of low viscosity characteristics is produced.

2. Method of producing cellulose acetate of low viscosity characteristics which comprises acetylating cellulose in the presence of an acetylating agent containing a catalyst comprising sulphuric acid, permitting the temperature of the acetylation mixture to rise above normal acetylation temperature for a short period during the acetylation, and then completing the acetylation at normal acetylation temperatures, whereby a cellulose acetate having a viscosity of 0.1 to 5.0 is produced.

3. The method of producing organic acid esters of cellulose of low viscosity characteristics comprising esterifying cellulose in the presence of an esterifying agent containing a strong esterification catalyst, permitting the temperature of reaction to rise to 50 to 55° C. for a short period and thereafter maintaining a temperature of 40 to 55° C. until a product of low viscosity characeristics is produced.

4. The method of producing cellulose acetate of low viscosity characteristics comprising acetylating cellulose in the presence of an acetylating agent containing a strong acetylation catalyst, permitting the temperature of reaction to rise to 50 to 55° C. for a short period and thereafter maintaining a temperature of 40 to 55° C. until a product of low viscosity characteristics is produced.

5. The method of producing organic acid esters of cellulose of low vscosity characteristics comprising esterifying cellulose in the presence of an esterifying agent containing a strong esterification catalyst, permitting the temperature of reaction to rise to 50 to 55° C. for a short period and thereafter maintaining a temperature of 40 to 55° C. until a product having a viscosity of 0.1 to 5.0 is produced.

6. The method of producing cellulose acetate of low viscosity characteristics comprising acetylating cellulose in the presence of an acetylating agent containing a strong acetylation catalyst, permitting the temperature of reaction to rise to 50 to 55° C. for a short period and thereafter maintaining a temperature of 40 to 55° C. until a product having a viscosity of 0.1 to 5.0 is produced.

7. The method of producing organic acid esters of cellulose of low viscosity characteristics comprising sulfuric acid, permitting the temperature an esterifying agent containing a catalyst comprising sulfuric acid, permitting the temperature of reaction to rise to 50 to 55° C for a short period, thereafter maintaining a temperature of 40 to 55° C. until a product of low viscosity characteristics is produced, then lowering the temperature of the mass, adding a small quantity of water and allowing the product to ripen.

8. The method of producing cellulose acetate of low viscosity characteristics comprising acetylating cellulose in the presence of an acetylating agent containing a catalyst comprising sulfuric acid, permitting the temperature of reaction to rise to 50 to 55° C. for a short period, thereafter maintaining a temperature of 40 to 55° C. until a product of low viscosity characteristics is produced, then lowering the temperature of the mass, adding a small quantity of water and allowing the product to ripen.

9. The method of producing organic acid esters of cellulose of low viscosity characteristics comprising esterifying cellulose in the presence of an esterifying agent containing a catalyst comprising sulfuric acid, permitting the temperature of reaction to rise to 50 to 55° C. for a short period, thereafter maintaining a temperature of 40 to 55° C. until a product having a viscosity of 0.1 to 5.0 is produced, then lowering the temperature of the mass, adding a small quantity of water and allowing the product to ripen.

10. The method of producing cellulose acetate of low viscosity characteristics comprising acetylating cellulose in the presence of an acetylating agent comprising sulfuric acid, permitting the temperature of reaction to rise to 50 to 55° C. for a short period, thereafter maintaining a temperature of 40 to 55° C. until a product having a viscosity of 0.1 to 5.0 is produced, then lowering the temperature of the mass, adding a small quantity of water and allowing the product to ripen.

11. Method of preparing cellulose acetate of low viscosity characteristics comprising mixing substantially 100 parts of cellulose and a mixture containing substantially 300 to 400 parts of acetic anhydride, substantially 300 to 400 parts of acetic acid and substantially 10 to 15 parts of sulphuric acid, permitting the temperature of the resulting reaction to rise to about 50° to 55° C., maintaining a temperature near this point until a cellulose acetate of "lacquer grade" is formed, then lowering the temperature of the mass, addng a small quantity of water and allowing the product to ripen.

12. Method of preparing cellulose acetate of low viscosity characteristics comprising mixing substantially 100 parts of cellulose and a mixture containing substantially 300 to 400 parts of acetic anhydride, substantially 300 to 400 parts of acetic acid and substantially 10 to 15 parts of sulphuric acid, permitting the temperature of the resulting reaction to rise to about 50° to 55° C. and maintaining a temperature at this point until a cellulose acetate of "lacquer grade" is formed, then adding a small quantity of water and allowing the product to ripen until the product is soluble in hot chloroform, and then precipitating the mass with a larger quantity of water.

13. Method of preparing cellulose acetate of low viscosity characteristics comprising mixing substantially 100 parts of cellulose and a mixture containing substantially 300 to 400 parts of acetic anhydride, substantially 300 to 400 parts of acetic acid and substantially 10 to 15 parts of sulphuric acid, permtting the temperature of the resulting reaction to rise to about 50° to 55° C. and maintaining a temperature at this point until a cellulose acetate of "lacquer grade" is formed, then lowering the temperature of the mass, adding a small quantity of water and allowing the prcduct to ripen until the product is soluble in hot chloroform, and then precipitating the mass with a larger quantity of water.

14. Method of preparing cellulose acetate of low viscosity characteristics comprising mixing substantially 100 parts of cellulose and a mixture containing substantially 300 to 400 parts of acetic anhydride, substantially 300 to 400 parts of acetic acid and substantially 10 to 15 parts of sulphuric acid, permitting the temperature of the resulting reaction to rise to about 50° to 55° C. and maintaining a temperature at this point until a cellulose acetate of "lacquer grade" is formed, then lowering the temperature of the mass to below 20°–30° C., adding a small quantity of water and allowing the product to ripen until the product is soluble in hot chloroform, and then precipitating the mass with a larger quantity of water.

15. In a process for the production of low viscosity cellulose acetate, the acetylation step which comprises permitting the temperature of the reaction to rise above normal acetylation temperature for a short period during the esterification and then completing the esterification at normal acetylation temperature.

16. In a process for the production of low viscosity cellulose acetate, the acetylation step which comprises initially acetylating the cellulose for a short period at a temperature higher than normal acetylation temperatures and then completing the acetylation at normal acetylation temperature.

GEORGE SCHNEIDER.

CERTIFICATE OF CORRECTION.

Patent No. 2,192,277.   March 5, 1940.

GEORGE SCHNEIDER.

It is hereby certified that error appears in the printed specification of the above numbered patent requiring correction as follows: Page 3, first column, line 58, claim 7, strike out the words "sulfuric acid, permitting the temperature" and insert instead esterifying cellulose in the presence of; and second column, line 17, claim 10, for "comprising a catalyst containing" read containing a catalyst comprising; and that the said Letters Patent should be read with this correction therein that the same may conform to the record of the case in the Patent Office.

Signed and sealed this 30th day of April, A. D. 1940.

(Seal)
Henry Van Arsdale,
Acting Commissioner of Patents.